(12) United States Patent
Arnaudov et al.

(10) Patent No.: US 12,310,388 B2
(45) Date of Patent: May 27, 2025

(54) DRESSING COMPOSITION COMPRISING PLANT PROTEIN

(71) Applicant: Conopco, Inc., Englewood Cliffs, NJ (US)

(72) Inventors: Luben Nikolaev Arnaudov, Spijkenisse (NL); Henk Husken, Arnhem (NL); Krassimir Petkov Velikov, Utrecht (NL)

(73) Assignee: Conopco, Inc., Hoboken, NJ (US)

( * ) Notice: Subject to any disclaimer, the term of this patent is extended or adjusted under 35 U.S.C. 154(b) by 543 days.

(21) Appl. No.: 17/763,828

(22) PCT Filed: Sep. 20, 2020

(86) PCT No.: PCT/EP2020/076377
§ 371 (c)(1),
(2) Date: Mar. 25, 2022

(87) PCT Pub. No.: WO2021/069205
PCT Pub. Date: Apr. 15, 2021

(65) Prior Publication Data
US 2022/0338517 A1    Oct. 27, 2022

(30) Foreign Application Priority Data
Oct. 11, 2019  (EP) .................................... 19202807

(51) Int. Cl.
| A23L 27/60 | (2016.01) |
| A23L 33/115 | (2016.01) |
| A23L 33/185 | (2016.01) |
| A23L 29/212 | (2016.01) |

(52) U.S. Cl.
CPC ............. *A23L 27/60* (2016.08); *A23L 29/212* (2016.08); *A23L 33/115* (2016.08); *A23L 33/185* (2016.08)

(58) Field of Classification Search
None
See application file for complete search history.

(56) References Cited

U.S. PATENT DOCUMENTS

| 3,892,873 | A | * | 7/1975 | Kolen ..................... A23L 27/66 |
| | | | | 426/613 |
| 4,734,287 | A | | 3/1988 | Singer et al. |
| 6,479,083 | B1 | | 11/2002 | Han et al. |
| 6,586,033 | B1 | | 7/2003 | Gimelli et al. |
| 2005/0089621 | A1 | | 4/2005 | Aquino et al. |
| 2008/0181990 | A1 | | 7/2008 | Ledbetter et al. |
| 2010/0063254 | A1 | | 3/2010 | Lotz et al. |
| 2010/0119650 | A1 | | 5/2010 | Moca et al. |
| 2017/0251708 | A1 | | 9/2017 | Benjamin et al. |

FOREIGN PATENT DOCUMENTS

| AU | 8267787 | 6/1989 |
| CN | 107361350 | 11/2017 |
| EP | 2745711 | 6/2014 |
| GB | 510821 | 8/1939 |
| JP | S6332461 | 2/1988 |
| JP | 2007014291 | 1/2007 |
| KR | 20170057794 | 5/2017 |
| WO | WO2007054199 | 5/2007 |
| WO | WO2008049385 | 5/2008 |
| WO | WO2013067453 | 5/2013 |
| WO | WO2014001030 | 1/2014 |

OTHER PUBLICATIONS

Search Report and Written Opinion in EP19202807.4; Apr. 2, 2020; European Patent Office (EPO).
Search Report and Written Opinion in PCT/EP2020/076377; Dec. 7, 2020; World Intellectual Property Org. (WIPO).
International Preliminary Report on Patentability in PCT/EP2020/076377; Sep. 13, 2021; World Intellectual Property Org. (WIPO).
A. Akcicek, et al., "Utilization of cold pressed chia seed oil waste in a low-fat salad dressing as natural fat replacer", Journal of Food Process Engineering, 41(5), e12694, pp. 1-10 (2018).
M. Alderliesten, "Mean Particle Diameters. Part II: Standardization of nomenclature", Particle & Particle Systems Characterization, 8, pp. 237-241 (1991).
D. C. P. Campos, et al., "Soy-based low fat emulsion: stability, rheology, nutritional value and consumer acceptance", Ciência e Tecnologia de Alimentos; 29(4), pp. 919-926 (2009).
E. Neta, et al., "The Chemistry and Physiology of Sour Taste", Journal of Food Science, 72(2), pp. R33-38 (2007).
V. Raikos, et al., "Comparative study of the functional properties of lupin, green pea, fava bean, hemp, and buckwheat flours as affected by pH", Food Science & Nutrition; 2(6), pp. 802-810 (2014).
A. Raymundo, et al., "Optimization of the Composition of Low-Fat Oil-in-Water Emulsions Stabilized by White Lupin Protein", Journal of the American Oil Chemists' Society, 79(8), pp. 783-790 (2002).
J. V. C. Silva, et al., "Heat-induced gelation of micellar casein/plant protein oil-in-water"; Colloids and Surfaces, A: Physicochemical and Engineering Aspects, 569, pp. 85-92 (2019).

(Continued)

*Primary Examiner* — Jyoti Chawla
(74) *Attorney, Agent, or Firm* — Stephanie S. DelPonte

(57) ABSTRACT

Food composition in the form of an oil-in-water emulsion comprising water, a first acidulant selected from the group consisting of lactic acid, benzoic acid, acetic acid, sorbic acid and mixtures thereof, structurant, selected from the group consisting of starch, flour, gum, fiber and mixtures thereof, 5 to 60 wt % of vegetable oil, non-soy plant protein having an average particle size of below 100 micrometers, and a second acidulant, having a pKa of 3.2 or lower, wherein the weight ratio between plant protein and vegetable oil is ≥0.3, and wherein the pH of the composition is of between 2.5 and 4.5.

17 Claims, 1 Drawing Sheet

(56) References Cited

OTHER PUBLICATIONS

65% Calorie-Reduced Mayonnaise, Record ID 4294313; Mintel GNPD; 2 pages (2016).
65% Calorie-Reduced Mayonnaise, Record ID 6099729; Mintel GNPD; 3 pages (2018).
Aquafaba Mayo, Record ID 5610993; Mintel GNPD; 3 pages (2018).

* cited by examiner

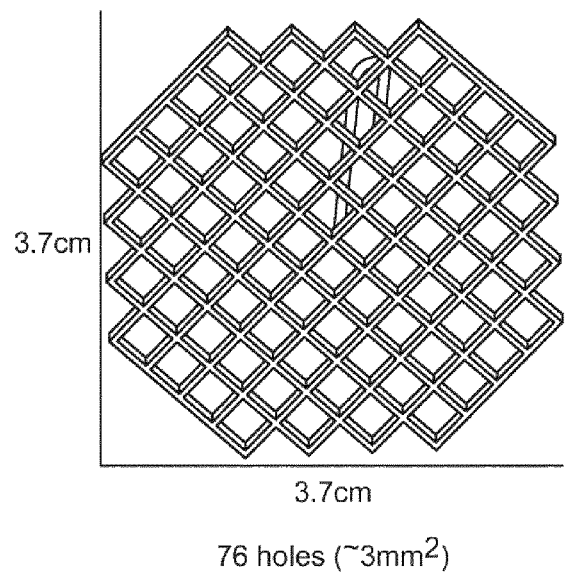

DRESSING COMPOSITION COMPRISING PLANT PROTEIN

FIELD OF THE INVENTION

The present invention relates to an oil-in-water emulsion with a pH of 2.5 to 4.5 comprising plant protein. It further relates to a method to produce said composition.

BACKGROUND OF THE INVENTION

Dressing compositions, such as mayonnaise or salad dressing, often comprise oil which has been emulsified in a continuous aqueous phase, thereby forming an oil-in-water emulsion. The dressing is acidified, using vinegar, to a pH of 2.5 to 4.5, for reasons of taste and microbiological stability. The oil level of such a dressing can reach to up to 87 wt % in high oil mayonnaises. The emulsion is stabilized by an emulsifier, which keeps the oil droplets stably dispersed in the aqueous phase, due to its surface activity, thereby preventing the oil droplets from coalescing. The emulsifier that is commonly used in the field of mayonnaise and salad dressing is egg yolk. Apart from stability of the emulsion, egg yolk provides the dressing composition, in particular the mayonnaise composition, with a characteristic gloss, desired by the consumer, and the texture of the emulsion has a smoothness that is a homogenous texture through the product, resulting in homogenous appearance and mouthfeel.

Lower oil dressings are known and may comprise from 3 to 70 wt % oil. As the texture of high oil mayonnaises is to the most extent created by the high oil level, i.e. the densely packed oil droplets in the continuous aqueous phase, dressings compositions with less oil require a filler to stabilize the aqueous phase and maintain the desired texture. Fillers that are used are starch, flour or gum.

Some consumer groups became more aware of the health aspects foods, and became interested in a dressing composition, in particular a mayonnaise-like composition, which has the traditional look and feel of high oil mayonnaise, in terms of mouthfeel and viscosity, but which contains less oil, less carbohydrates, and no animal-derived emulsifiers, i.e. which is free from egg. In particular, an interest arose to fit the dressing, in particular a mayonnaise-like dressing, in a more balanced diet. In this respect, it was desired to provide a dressing wherein the protein level is relatively high, to contribute to the daily energy and protein intake. It is desired, that the energy contribution from the protein has to be significant, at least 10% from the total energy content from both oil and protein, to enable a significant contribution to our protein intake. This may be of particular relevance for elderly people.

It can be conceived, that adaptation of a high oil mayonnaise to a mayonnaise-like product meeting the above-mentioned consumer desires comes with inherent technical challenges. Indeed, viscosity, as provided by the high oil level, needs to be compensated for. Furthermore, the texture and gloss as provided by the egg-yolk emulsifier need to be taken care for: It appears that plant protein can provide an inhomogeneous or 'sandy' mouthfeel to a dressing or mayonnaise composition, a problem that is prone to a higher extent when protein levels are increased, in a high-protein formulation. It further appeared that reformulating current dressing products to comprise a relatively high level of plant protein (e.g. 6 to 30 wt %) gave a very sour taste to the product, rendering it unacceptable for sale on industrial scale. The formulation of a high-protein, low oil, emulsified composition meeting the organoleptic profile, including taste, of conventional mayonnaise, remained a challenge and is not predictable.

A need therefore arose for a low-oil (less than 70 wt %) dressing composition, in particular a mayonnaise composition, with high protein content (e.g. 6 to 30 wt %), which is microbially stable, does not depend on the presence of egg-derived emulsifier for its emulsion stability, and reflects the texture, appearance, taste and mouthfeel of a conventional, preferably high oil, dressing composition, preferably mayonnaise composition.

SUMMARY OF THE INVENTION

Surprisingly, this challenge was, at least partly, overcome by the composition as described in the first aspect of the invention, and the method as described in the second aspect of this invention.

In a first aspect, the present invention relates to a food composition in the form of an oil-in-water emulsion comprising:
  Water,
  A first acidulant selected from the group consisting of lactic acid, benzoic acid, acetic acid, sorbic acid and mixtures thereof,
  Structurant, selected from the group consisting of starch, flour, gum, fiber and mixtures thereof,
  5 to 60 wt % of vegetable oil,
  non-soy plant protein, having an average particle size D3,2 in the composition of below 100 micrometers,
  wherein the ratio of plant protein to vegetable oil is equal or more than 0.3,
  A second acidulant, having a pKa, at 20° C., of 3.2 or lower, wherein the pH of the composition is of between 2.5 and 4.5.

In a further aspect, the invention relates to a process to manufacture the composition of the invention, the process comprising the steps of:
a) Preparing an aqueous phase comprising;
  water,
  a first acidulant selected from the group consisting of lactic acid, benzoic acid, acetic acid, sorbic acid and mixtures thereof,
  structurant, selected from the group consisting of starch, flour, gum, fiber and mixtures thereof,
  non-soy plant protein, based on the weight of the resulting composition, with an average particle size D3,2 of less than 100 micrometers,
b) Preparing an oil phase comprising vegetable oil in an amount of 5 to 60 wt %, based on the weight of the resulting composition,
c) Mixing the oil phase and the aqueous phase,
d) Adding a second acidulant, having a pKa of 3.2 or less, wherein step d) is carried out together with step a), or during or after step c),
to result in an oil-in-water emulsion having a pH of between 2.5 and 4.5, wherein the ratio of plant protein to vegetable oil is equal or more than 0.3.

DETAILED DESCRIPTION

All percentages, unless otherwise stated, refer to the percentage by weight (wt %).

"Spoonable" means that a composition is semi-solid but not free-flowing on a time scale typical for eating a meal, meaning not free-flowing within a time period of an hour. A sample of such substance is able to be spooned-out with a spoon from a container containing the composition.

Except in the operating and comparative examples, or where otherwise explicitly indicated, all numbers in this description indicating amounts or ratios of material or conditions of reaction, physical properties of materials and/or use are to be understood as modified by the word "about".

Features described in the context of one aspect of the invention can be applied in another aspect of the invention.

The invention provides a food composition as defined in the first aspect above.

Composition

Emulsion

The composition of the invention is in the form of an oil-in-water emulsion. Examples of oil-in-water emulsions encompassed by the present invention include emulsified sauces, such as mayonnaise, and dressings, such as salad dressings. Preferably, the food composition is an emulsified sauce or dressing, preferably a mayonnaise, a salad dressing, a dip, or a sandwich spread, more preferably a mayonnaise or a salad dressing and most preferably is a mayonnaise. Generally, a mayonnaise is spoonable, while a salad dressing is pourable.

It is preferred that (after emulsifying) the emulsion is stable for more than one hour, preferably during a time period of half a year or more (like for example some mayonnaises).

Mayonnaise is generally known as a thick, creamy sauce that can be used as a condiment with other foods. Mayonnaise is a stable water-continuous emulsion of typically vegetable oil, egg yolk and either vinegar or lemon juice. In many countries the term mayonnaise may only be used in case the emulsion conforms to the "standard of identity", which defines the composition of a mayonnaise. For example, the standard of identity may define a minimum oil level, and a minimum egg yolk amount. Also, mayonnaise-like products having oil levels lower than defined in a standard of identity or not containing egg yolk can be considered to be mayonnaises in the context of the present invention. Mayonnaises may vary in colour, and are generally white, cream-coloured, or pale yellow. The texture may range from light creamy to thick. Mayonnaises in the context of the present invention do not necessarily need to conform to a standard of identity in any country.

Oil

The present invention relates to a product with a relatively low oil content. The oil used in the invention is vegetable oil. In the context of the present invention, oil derived from algae is considered a vegetable oil as well. In the present invention, the concentration of vegetable oil ranges from 5 to 60 wt %, preferably from 10 wt % to 30 wt %, even more preferably of from 10 to 20 wt %, based on the weight of the composition. Any combination of ranges using these mentioned end points are considered to be part of the invention as well.

Preferred oils for use in the context of this invention are vegetable oils which are liquid at 5° C. Preferably the oil comprises an oil selected from the group consisting of sunflower oil, rapeseed oil, olive oil, soybean oil, and combinations of these oils. Therefore, preferably the vegetable oil is an edible oil.

Water

The composition of the invention comprises water. Water forms the continuous phase in the oil-in-water emulsion of the product of the invention. The total amount of water is preferably of from 25 to 80 wt %, more preferably of from 50 to 75 wt %, based on the weight of the composition. Any combination of ranges using these mentioned end points are considered to be part of the invention as well.

Plant Protein

The composition of the present invention preferably comprises plant protein in an amount of from 4 to 30 wt %, more preferably of from 6 to 30 wt %, based on the weight of the composition. Preferably, the amount of plant protein is from 7 to 20 wt %, even more preferably of from 8 to 15 wt %, based on the weight of the composition. The plant protein functions as an emulsifier, in this way stabilizing the oil droplets in the continuous aqueous phase of the oil-in-water emulsion.

The plant protein preferably is selected from the group consisting of pulse protein, oil seed protein and mixtures thereof. Preferably the plant protein is pulse protein. Pulse is the family of Fabaceae. Pulse protein is preferably selected from the group consisting of pea protein, lentil protein, chickpea protein, lupin protein, faba bean protein and mixtures thereof. More preferably pulse protein is selected from the group consisting of pea protein, lentil protein, chickpea protein and mixtures thereof. More preferably the pulse protein is selected from the group consisting of pea protein, lentil protein and mixtures thereof. More preferred, the pulse protein is selected from the group consisting of pea protein, chickpea protein and mixtures thereof. Most preferred, the pulse protein is pea protein. Pea and chickpea protein resulted in optimal results in the context of the invention. Preferably, the protein in the composition of the invention is pea protein. Oil seed protein is preferably selected from the group consisting of rape seed protein, sunflower protein, canola protein and mixtures thereof, preferably consisting of sunflower seed protein, rape seed protein and mixtures thereof. Soy protein appeared not suitable for the present invention, as it affected the structure of the product, e.g. in terms of mouthfeel and gel-formation in the product. From a consumer perspective, it was also desired to develop a non-soy protein, as soy is associated with crops using GMO and soy protein involves allergic concerns.

To be suitable for the present invention, it was found that the protein should have an average particle size of smaller than 100 micrometres. Preferably, the protein is present in the composition with an average particle size $D_{3,2}$ of from 0.01 to 50 micron, more preferably 0.01 to 20 micrometers (see M. Alderliesten, Particle & Particle Systems Characterization 8 (1991) 237-241; for definitions of average diameters).

It was found, that the texture and mouthfeel of the composition could be negatively affected by the high amount of protein. It was found, that therefore the protein is preferably present in denatured form, which improved this situation, thereby resembling more the appearance and mouthfeel of a conventional dressing or mayonnaise, i.e. without added protein. The denatured form of the protein can be obtained for example by cooking the protein before adding it to the composition. Plant protein preferably is plant protein cooked in water with a temperature above its denaturation temperature. Preferably the plant protein is heated, preferably in the presence of water, at a temperature of from 55 to 100° C., preferably of from 65 to 95° C.

It is of particular advantage, if the weight ratio of plant protein to vegetable oil is equal or more than 0.3, i.e. 30%, preferably of from 33% to 81%, preferably of between 44 to 60%. This is calculated as [(weight of plant protein)/(weight of vegetable oil)]×100%.

Structurant

The composition further comprises a structurant. The structurant is selected from the group consisting of starch, flour, gum, fiber and mixtures thereof. The structurant may comprise gum, such as for example xanthan gum, and gum may be present in an amount of from 0.05 to 2 wt %, preferably 0.1 to 1.5 wt %, based on the weight of the composition (dry wt. gum/wet wt. composition). The structurant may comprise starch. Starch is preferably present in an amount of from 0.1 to 12 wt %, preferably of from 0.5 to 10 wt %, even more preferably of from 1 to 8 wt %, even more preferably in an amount of from 1 to 6 wt %, even more preferably in an amount of from 2 to 5 wt %, (dry wt. starch on wet wt. composition). The starch can be preferably modified starch. Preferably the starch is chemically modified starch or physically modified starch. Preferably the starch is selected from the group consisting of corn starch, potato starch, tapioca starch and mixtures thereof. More preferably the starch is corn starch. It might be preferred that the structurant comprises fibers, preferably fibers extracted from parenchymal plant tissues, such as citrus fibers. Fibers, preferably citrus fibers, are preferably present in an amount of from 0.1 to 4.0 wt %, preferably of from 0.3 to 2.5 wt % (dry wt. fiber on wet weight composition).

Acids and pH

The composition of the invention has a pH of between 2.5 and 4.5, more preferably between 2.5 and 4. This is the pH that is desired for reasons of e.g. taste, associated with salad dressings and mayonnaise-like products.

It was observed, that at the high protein levels and at the protein/oil ratio according to the invention, dressing products like mayonnaise (oil-in-water emulsions with vinegar) with their conventional pH, pH 2.5-4.5, tasted intolerably sour, which is unacceptable from a product development perspective. According to literature (Neta, 2007), sour taste perception is a complex event from both chemical and physiological standpoints. No efficient control of flavour in the formulation of acid and acidified foods can be done, as a clear understanding of the chemistry and physiology of sour taste is lacking. It is evident that no simple relationship exists between sour taste intensity and hydrogen ions. Likewise, sour taste intensity of acids cannot be entirely explained by other variables, including titratable acidity, buffer capacity, molar concentration, physical and chemical structure, and so on (Neta et al. J. of Food Science 2007; Vol 72(2). It is currently not possible to accurately predict and modify sour taste intensity in foods by simply knowing the concentration of acids and pH (Neta et al. J. of Food Science 2007; Vol 72(2).

Accordingly, the composition of the invention comprises a first acidulant selected from the group consisting of acetic acid, lactic acid, benzoic acid, sorbic acid, salts thereof, and mixtures thereof. Salts preferably are sodium or potassium salts. Preferably the composition comprises acetic acid, most preferably, the acidulant is acetic acid.

The first acidulant selected from the group consisting of acetic acid, lactic acid, benzoic acid, sorbic acid and mixtures thereof contributes to achieve microbiological safety. The amount of first acidulant can be adjusted by the skilled person depending on the level of microbiological activity reduction that is desired. The first acidulant preferably comprises acetic acid. Most preferably, the first acidulant is acetic acid. The total amount of first acidulant in the composition is preferably of from 0.2 to 3.0 wt %, more preferably of from 0.3 to 2.0 wt %. Acetic acid is preferably present in an amount of from 0.2 to 3.0 wt %, more preferably of from 0.3 to 2.0 wt %. The total amount of non-dissociated acetic acid preferably is between 0.2 and 3.0, more preferably of between 0.3 and 1.0 wt %, based on the weight of the composition. Acetic acid is preferably added in the form of vinegar, such as spirit vinegar. Vinegar comprises acetic acid in an amount of from 6 to 12 wt %. Vinegar is preferably added to and present in the composition in an amount of from 2 to 10 wt %, preferably of from 2 to 5 wt %.

In case a concentration of an acidulant is provided, then this concentration refers to total concentration of the acid and its corresponding salt.

In the present invention, it was found that by addition of a stronger acid (with pKa of 3.2 or less), instead of additional weak acid, the taste of a low oil, protein-comprising dressing product, preferably a mayonnaise, was not affected to this extent. Counter-intuitively, by addition of an acidulant with a pKa of 3.2 or below, the problem could be overcome, and a pleasant tasting product was obtained with taste resembling the one of conventional mayonnaise. Therefore, according to the invention, in addition to the first acidulant, a further acidulant is present, with a pKa of 3.2 or less. The second acidulant is preferably selected from the group consisting of $NaHSO_4$, $KHSO_4$, $NH_4HSO_4$, $NaH_3P_2O_7$, $KH_3P_2O_7$, phosphoric acid, pyrophosphoric acid, tartaric acid, fumaric acid, citric acid, tartaric acid, hydrochloric acid and mixtures thereof. More preferably, the second acidulant is selected from the group consisting of $NaHSO_4$, phosphoric acid, citric acid and mixtures thereof. Most preferably, the second acidulant is citric acid. The second acidulant is preferably present in an amount to provide a pH of the composition in the range of between 2.5 and 4.5. This amount is easily determined by a person skilled in the art, e.g. by the use of a pH meter.

Other Ingredients

The composition of the invention preferably contains additionally other ingredients than already specifically mentioned in here. It may be preferred that the composition contains herbs and/or spices. In case such ingredients are present in the composition, then generally their total concentration is preferably at least 0.1% by weight, and preferably maximally 10% by weight, preferably maximally 5% by weight. It may be preferred that the composition comprises added flavours, more preferably oil-dissolvable flavours.

The composition of the invention may comprise sugar, preferably sucrose, but high levels are not desired. Sugar, preferably sucrose, may be present to an amount of from 0.1 to 15 wt %, preferably of from 0.3 to 6 wt %, even more preferably of from 0.4 to 5 wt %, most preferably of from 0.5 to 4 wt %, based on the weight of the composition.

Total alkaline metal salt, for example sodium chloride, may be present to an extent of from 0.1 to 5 wt %, preferably from 0.15 to 4 wt %, or more preferably of from 0.2 to 3 wt %, based on the weight of the composition.

The present invention provides a dressing composition, preferably a mayonnaise or salad dressing composition, that comprises plant protein. Apart from nutritional benefits, the plant protein allows the oil droplets to be stably emulsified in the continuous aqueous phase of the oil-in-water emulsion. In this manner, the plant protein functions as a surface-active emulsifier. Egg-derived ingredients, such as egg yolk, are not needed. Preferably, the composition of the invention is free from egg yolk, more preferably it is free from egg-derived ingredients, most preferably the composition is free from animal-derived ingredients. 'Animal-derived' includes products produced by animals such as eggs or milk.

The composition of the invention has a homogenous texture and mouthfeel. The rheological properties of the composition can be expressed in elastic modulus G' (in Pa) and Stevens Value (in grams). The G' preferably is between 1000 and 4000 Pa, preferably between 1500 and 3000 Pa, as measured at 20° C. The Stevens Value (in grams) is preferably of between 50 g and 400 g, more preferably of between 100 and 200 g, and even more preferably of between 100 g and 150 g, as measured at 20° C.

The average droplet size D3.2 of the oil droplets in the emulsion is preferably from 0.2 to 75, more preferably of between 5 and 50 μm, most preferably of between 10 and 30 microns, see M. Alderliesten, Particle & Particle Systems Characterization 8 (1991) 237-241; for definitions of average diameters).

A preferred composition according to the invention is a food composition in the form of an oil-in-water emulsion comprising:

10 to 20 wt % of vegetable oil,
50 to 75 wt % of water,
Acetic acid in an amount of from 0.2 to 3.0 wt %,
Structurant, being starch, in an amount of 2 to 6 wt %,
6 to 12 wt % of plant protein, having an average particle size D3,2 in the composition of from 0.01 to 100 micrometers, wherein the protein is denatured protein, the protein being pea protein, lentil protein or chickpea protein,
Acidity regulator with a pKa, at 20° C., of 3.2 or lower, comprising citric acid or phosphoric acid,
wherein the weight ratio of plant protein to vegetable oil is equal to or more than 30%,
wherein the composition has a pH of between 2.5 and 4.5.

Method

In a second aspect, the invention relates to a method to manufacture the composition of the invention.

In step a) of the process an aqueous phase is prepared comprising water and vinegar. Salt and sugar may be added as well at this stage. The aqueous phase preferably comprises from 25 to 80 wt % of water, more preferably of from 50 to 75 wt %, based on the weight of the resulting composition.

The aqueous phase further comprises a first acidulant, selected from the group consisting of acetic acid, lactic acid, benzoic acid, sorbic acid and mixtures thereof. First acidulant is preferably added to the aqueous phase in an amount of from 0.2 to 3.0 wt %, more preferably of from 0.3 to 2.0 wt %, based on the weight of the resulting composition. Acetic acid is preferably present, and in an amount of from 0.2 to 3.0 wt %, more preferably of from 0.3 to 2.0 wt %, based on the weight of the resulting composition. The total amount of non-dissociated acetic acid preferably is between 0.2 and 3.0, more preferably of between 0.3 and 1.0 wt %, based on the weight of the resulting composition.

The aqueous phase preferably comprises vinegar, as a carrier to add acetic acid. Vinegar preferably comprises acetic acid in an amount of from 6 to 12%. Vinegar preferably is added in an amount of from 2 to 6 wt %, preferably of from 3 to 5 wt %. It is preferably added in an amount to provide an amount of non-dissociated HAc to the aqueous phase in the resulting composition of from 0.2 to 1 wt %, preferably of from 0.3 to 0.5 wt %, based on the weight of the aqueous phase.

It may be preferred, that the aqueous phase in step a) comprises from 0.2 to 1 wt %, preferably of from 0.3 to 0.5 wt % undissociated HAc.

The process comprises the addition of structurant. The structurant is preferably added during step a) into the aqueous phase. It is preferred, that the structurant is starch, and starch is added during step a) after heating it in the presence of water to a temperature above its gelatinization temperature.

The plant protein is added in step a) of the process.

The plant protein preferably is heated, more preferably heated in the presence of water, wherein heating is carried out above the denaturation temperature of the protein. It was found that in the composition of the invention, this overcame the problem of a sandy texture and mouthfeel. The protein is preferably heated to a temperature of above 65° C., preferably between 65 and 100° C., more preferably of between 65 to 90° C. It may be preferred, that the process comprises a heating step, wherein the protein is heated above the denaturation temperature of the protein, preferably in the presence of water, before addition of the protein in step a). It is preferred, that the protein is heated together with starch in the presence of water at a temperature above the highest of the gelatinization temperature of the starch or the denaturization temperature of the protein, before addition in step a), preferably above 65° C., preferably between 65 and 100° C., more preferably of between 65 to 90° C.

The protein is preferably added as powder. The average particle size of the protein before addition is preferably less than 100 micrometers, preferably of between 0.01 and 50 micrometers, more preferably of between 0.01 and 20 micrometers. The process may comprise a grinding step of the protein to obtain such size, before the protein is added during step a).

In step b) an oil phase is prepared. The oil phase comprises vegetable oil. Vegetable oil is added in an amount of from 5 to 60 wt %, preferably in an amount of from 10 to 40 wt %, based on the weight of the resulting composition.

In step c) the aqueous phase and the oil phase are mixed. Mixing step c) is carried out to provide an oil-in-water emulsion. The average oil droplet size resulting from such mixing D3.2 of the oil droplets in the emulsion is preferably from 0.2 to 75 μm, more preferably of between 5 and 50 μm, most preferably of between 10 and 30 microns.

The second acidulant, having a pKa of 3.2 or below, is added in step d). Step d) is preferably carried out with step a), in this way the additional (i.e. second) acidulant is added during step a) of the process into the aqueous phase. It might be preferred, however, that the acidulant with pKa of 3.2 or less is added during mixing step c) or after mixing step c). In the latter case, the acidulant with pKa of 3.2 or less is mixed into the emulsion resulting from step c). The second acidulant preferably is added, and present, in an amount to achieve a pH of the resulting composition of between 2.5 and 4.5.

The technology to prepare oil-in-water emulsions is known in the art, e.g. for mayonnaise making, and is suitably carried out with a shear mixing device as known in the art such as a colloid mill, rotor-stator homogenizer, Silverson mixing apparatus. High pressure homogenization is however less desired, in view of the presence of high protein and structurant that could interfere with such process. HPH may result in difficulties with the processing due to the particle size of the protein, so that the HPH might get clogged. Another reason to avoid HPH is that the high shear during such processing will affect the thickening abilities of the structurant (starch, flour, gum) present in the formulation. Therefore, preferably the process does not involve high pressure homogenization.

The invention further preferably relates to a product obtainable by the process of the invention, preferably, that is obtained by the process of the invention.

Methods—Texture Measurements

Thickness—Stevens value: the Stevens value is determined at 20° C. by using a Stevens LFRA Texture Analyser (ex Brookfield Viscometers Ltd., UK) with a maximum load/measuring range of 1000 grams, and applying a penetration test of 25 mm using a grid, at 2 mm per second penetration rate, in a cup having a diameter of 65 mm, that contains the emulsion; wherein the grid comprises square openings of approximately 3×3 mm, is made up of wire with a thickness of approximately 1 mm, and has a diameter of 40 mm. One end of a shaft is connected to the probe of the texture analyser, while the other end is connected to the middle of the grid. The grid is positioned on the flat upper surface of the emulsion in the cup. Upon starting the penetration test, the grid is slowly pushed downward into the emulsion by the texture analyser. The final force exerted on the probe is recorded, giving the Stevens value in gram. A drawing of the grid is given in FIG. 1. The grid is made from stainless steel, and has 76 holes, each hole having a surface area of approximately 3×3 mm.

Viscosity—The viscosity can be determined by using a Brookfield viscometer (ex Brookfield Viscometers Ltd., UK) operated at 50 rpm and 20° C., using the appropriate spindle for the expected viscosity (according to ISO2555), in this case spindle #7. The spindle, connected to the viscometer probe, is lowered into the emulsion until the indentation on the spindle is reached. The resistance measured during the spinning of the spindle in the emulsion, is the viscosity in milli Pascal per second (mPa*s).

The invention is exemplified by the following, non-limiting examples:

EXAMPLES

The following compositions were prepared, as indicated in the tables below. The compositions were prepared by dispersing the starch and the protein powder in the required amount of the aqueous phase. Subsequently, that dispersion has been cooked at 85° C. for 10 minutes. Then, the amount of water in the resulting slurry is adjusted to compensate evaporation and upon cooling the slurry to 50° C., the other water-soluble ingredients are added upon mixing (salt, sugar, and acidulants). Finally, the emulsification of oil is carried out using a Silverson high shear mixer fitted with an emulsor screen. The emulsification is carried out at 5000 rpm while slowly adding the oil phase for about 5 minutes. After the oil phase has been incorporated, the rpm is increased to 7200 and mixed for another 90 seconds. All compositions showed a smooth appearance and smooth homogenous, non 'sandy', mouthfeel, resembling conventional mayonnaise. The samples were tasted by a tasting panel, in duplo, using 4 and 7 people, and samples were scored on sourness, using a 5-point score, wherein 5 represents intolerably sour, and 1 represents very mildly sour, pleasant taste similar to conventional mayonnaise compositions.

Comparative Examples 1-6

A first set of examples was prepared, using one acidulant, to evaluate the use of vinegar (includes acetic acid), as required acidulant (C.E. 1, 4, 7) in high protein, low oil mayonnaise. These comparative examples were compared with compositions (C.E. 2, 3, 5, 6, 8, 9) that contained an acid with pKa of less than 3.2. The latter compositions were not microbiologically stable.

Ingredients:
  Oil: soybean oil
  Vinegar: Spirit vinegar 12%, ex. Van der Steen B.V.
  Starch: Colflo-67
  Protein: pea protein isolate, Nutralys S85F, ex. Roquette.

|  | C.E. 1 | C.E. 2 | C.E. 3 |
|---|---|---|---|
| Soybean Oil | 10 wt % | 10 wt % | 10 wt % |
| water | 62.01 wt % | 75.79 wt % | 76.05 wt % |
| vinegar | 14.5 wt % | 0 wt % | 0 wt % |
| Starch, Colflo-67 | 5 wt % | 5 wt % | 5 wt % |
| Pea protein isolate | 4.85 wt % | 4.85 wt % | 4.85 wt % |
| acidulant | 1.743% HAc* | 0.72% citric acid | 0.46% H3PO4 |
| Salt and sugar | 3.64% | 3.64% | 3.64% |
| Total | 100 wt% | 100 w % | 100 wt % |
| pH | 3.74 | 3.72 | 3.76 |
| Av. Sourness score | 3.9 | 2 | 1.2 |
| S.D. | 0.74 | 1 | 0.45 |
| Taste range (Av. +/− SD) | 3.15 to 3 | 1 to 3 | 1 to 1.65 |

*HAc comes from the vinegar.
Using HAc resulted in a significantly higher sour taste than citric acid or H3PO4.

|  | C.E. 4 | C.E. 5 | C.E. 6 |
|---|---|---|---|
| Soybean Oil | 20 wt % | 20 wt % | 20 wt % |
| water | 39.16 wt % | 62.83 wt % | 63.27 wt % |
| vinegar | 24.9 wt % | 0 wt % | 0 wt % |
| Starch, Colflo-67 | 4 wt % | 4 wt % | 4 wt % |
| Pea protein isolate | 8.3 wt % | 8.3 wt % | 8.3 wt % |
| acidulant | 2.99% HAc* | 1.23% citric acid | 0.79% H3PO4 |
| Salt and sugar | 3.64% | 3.64% | 3.64% |
| Total | 100 wt % | 100 w % | 100 wt % |
| pH | 3.75 | 3.70 | 3.75 |
| Av. Sourness score | 4.6 | 2.6 | 2 |
| S.D. | 0.54 | 1.34 | 1 |
| Taste range (Av. +/− SD) | 4.05 to 5 | 1.26 to 3.94 | 1 to 3 |

*HAc comes from the vinegar.
Using HAc resulted in a significantly higher sour taste than citric acid or H3PO4

|  | C.E. 7 | C.E. 8 | C.E. 9 |
|---|---|---|---|
| Soybean Oil | 20 wt % | 20 wt % | 20 wt % |
| water | 10.16 wt % | 55.21 wt % | 56.06 wt % |
| vinegar | 47.4 wt % | 0 wt % | 0 wt % |
| Starch, Colflo-67 | 3 wt % | 3 wt % | 3 wt % |
| Pea protein isolate | 15.8 wt % | 15.8 wt % | 15.8 wt % |
| Salt and sugar | 3.64% | 3.64% | 3.64% |
| acidulant | 5.69% HAc* | 2.35% citric acid | 1.5% H3PO4 |
| Total | 100 wt % | 100 w % | 100 wt % |
| pH | 3.73 | 3.67 | 3.69 |
| Av. Sourness score | 5 | 3.4 | 1.6 |
| S.D. | 0 | 0.89 | 1.34 |
| Taste range (Av. +/− SD) | 5 to 5 | 2.51 to 4.29 | 1 to 2.94 |

*HAc comes from the vinegar.
Using HAc resulted in a significantly higher sour taste than citric acid or H3PO4.

Examples 10, 11, 12

A second set of examples showed that the sour taste perception of a composition comprising an acidulant with a pKa of below 3.2 is still very acceptable when a mandatory weak acid is present (HAc) in addition to the acidulant with pKa of below 3.2.

Ingredients
  Oil: Rapeseed Oil
  Protein: Chickpea protein concentrate ex. Innovopro (powder with 70.9% protein)
  Starch: Colflo-67 and Thermflo
  Vinegar: Spirit vinegar 12%, ex. Van der Steen B.V.

Example 10

Mayonnaise composition comprising chickpea protein and citric acid

|  | Example 10 |
| --- | --- |
| Rapeseed Oil | 19.21 wt % |
| Water | 59.90 wt % |
| vinegar (12% spirit vinegar) | 2.0 wt % |
| Starch, Colflo-67 | 4 wt % |
| Protein (chickpea powder) | 10.0 wt % |
| Sugar and salt | 3.64% |
| Acidulant | 1.25% citric acid |
| Total | 100 wt % |
| pH | 3.83 |

Example 11

Mayonnaise composition comprising chickpea protein and citric acid

|  | Example 11 |
| --- | --- |
| Rapeseed Oil | 19.18 wt % |
| Water | 59.38 wt % |
| vinegar (12% spirit vinegar) | 2.0 wt % |
| Starch, Thermflo | 4 wt % |
| Protein (chickpea powder) | 10.5 wt % |
| Sugar and salt | 3.64% |
| Acidulant | 1.30% citric acid |
| Total | 100 wt % |
| pH | 3.86 |

Example 12

Mayonnaise composition comprising pea protein and phosphoric acid

|  | Example 12 |
| --- | --- |
| Soybean Oil | 20.0 wt % |
| Water | 61.33 wt % |
| vinegar (12% spirit vinegar) | 1.83 wt % |
| Starch, Colflo-67 | 4 wt % |
| Pea protein isolate | 8.3 wt % |
| Sugar and salt | 3.64% |
| Acidulant | 0.90% phosphoric acid |
| Total | 100 wt % |
| pH | 3.89 |

The taste of the compositions according to examples 10, 11 and 12 was pleasant and considered similar to commercial mayonnaise composition, in terms of sourness.

The invention claimed is:

1. A food composition comprising:
   a. water;
   b. a first acidulant comprising lactic acid, benzoic acid, acetic acid, sorbic acid and mixtures thereof;
   c. a structurant comprising starch, in an amount of 0.1 to 12 wt %, based on the weight of the food composition;
   d. vegetable oil, in the amount of 5 to 60 wt %, based on the weight of the food composition;
   e. a non-soy plant protein, in an amount of 6 to 30 wt %, based on the weight of the food composition, having an average particle size of below 100 micrometers; and
   f. a second acidulant, having a pKa, at 20° C., of 3.2 or lower,
   wherein the weight ratio between non-soy plant protein and vegetable oil is ≥0.3,
   wherein the food composition is a spoonable oil-in-water emulsion,
   wherein the pH of the food composition is of between 2.5 and 4.5, and
   wherein an elastic modulus G' is from 1000 to 4000 Pa, and a Stevens Value is from 50 to 400 g, when measured at 20° C.

2. The food composition according to claim 1, wherein the structurant further comprises flour, gum, fiber and mixtures thereof, wherein said fiber, if present, is present in an amount of 0.1 to 4 wt % based on the weight of the composition.

3. The food composition according to claim 1, wherein the non-soy plant protein comprises pea protein, lentil protein and/or chickpea protein.

4. The food composition according to claim 1, wherein the non-soy plant protein comprises pea protein.

5. The food composition according to claim 1, wherein the non-soy plant protein is denatured plant protein.

6. The food composition according to claim 5, wherein the denatured plant protein is pre-cooked plant protein.

7. The food composition according to claim 1, wherein the non-soy plant protein is present in particles dispersed in the composition, and wherein the particles have an average particle diameter D3,2 of less than 100 microns.

8. The food composition according to claim 7, wherein the particles have an average particle diameter D3,2 of between 5 and 50 microns.

9. The food composition according to claim 1, wherein the non-soy plant protein is present in an amount of 4 to 30 wt %, based on the weight of the composition.

10. The food composition according to claim 1, wherein the non-soy plant protein is present in an amount of 6 to 30 wt %, based on the weight of the composition.

11. The food composition according to claim 1, wherein the non-soy plant protein is present in an amount of 8 to 12 wt %, based on the weight of the composition.

12. The food composition according to claim 1, wherein the second acidulant is selected from $NaHSO_4$, $KHSO_4$, $NH_4HSO_4$, $NaH_3P_2O_7$, $KH_3P_2O_7$ phosphoric acid, pyrophosphoric acid, tartaric acid, fumaric, citric acid, hydrochloric acid and mixtures thereof.

13. The food composition according to claim 1, wherein the fiber is fiber extracted from parenchymal plant tissue.

14. The food composition according to claim 1, wherein the pH of the food composition is less than 4.

15. The food composition according to claim 1, wherein the pH of the food composition is between 2.5 and 3.8.

16. The food composition according to claim 1, wherein the food composition is a sauce.

17. The food composition according to claim 1, wherein the food composition is a mayonnaise.

* * * * *